United States Patent [19]

Hashimoto et al.

[11] Patent Number: 4,976,491
[45] Date of Patent: Dec. 11, 1990

[54] COWL AND DASH PANEL ASSEMBLY FOR A FRONT BODY CONSTRUCTION OF A MOTOR VEHICLE

[75] Inventors: Teruo Hashimoto, Higashihiroshima; Yoshio Fukushima; Toshifumi Suzuki, both of Hiroshima; Hiroshi Minamoto, Hiroshima, all of Japan

[73] Assignee: Mazda Motor Corporation, Hiroshima, Japan

[21] Appl. No.: 345,709

[22] Filed: May 1, 1989

[30] Foreign Application Priority Data

Apr. 30, 1988 [JP] Japan ............................ 63-59007[U]

[51] Int. Cl.⁵ .............................................. B62D 25/08
[52] U.S. Cl. ...................................... 296/192; 296/194
[58] Field of Search ..................... 296/192, 194, 187; 15/250.16, 260.17, 250.19

[56] References Cited

U.S. PATENT DOCUMENTS

| | | | |
|---|---|---|---|
| 3,120,673 | 2/1964 | Buchwald | 15/250.17 |
| 3,681,812 | 8/1972 | Colucci | 15/250.19 X |
| 4,285,540 | 8/1981 | Harada et al. | 296/192 |
| 4,718,712 | 1/1988 | Nakatani | 296/192 |
| 4,718,713 | 1/1988 | Sakamoto et al. | 296/192 |
| 4,750,780 | 6/1988 | Harasaki et al. | 296/192 |

FOREIGN PATENT DOCUMENTS 60-155679 10/1985 Japan .

Primary Examiner—Margaret A. Focarino
Assistant Examiner—Andrew C. Pike
Attorney, Agent, or Firm—Wenderoth, Lind & Ponack

[57] ABSTRACT

A front body construction of a motor vehicle includes a lower dash panel for separating an engine compartment and a cabin and a cowl portion provided on the lower dash panel such that a lower end of a windshield is supported at an upper portion of the cowl portion. The cowl portion includes an upper dash panel attached to an upper end portion of the lower dash panel so as to form a bottom wall of the cowl portion and a front cowl panel attached to an upper face of the upper dash panel so as to form a front wall of the cowl portion. The front cowl panel has, in a lateral direction of a vehicle body, opposite sides and a central portion such that space for an auxiliary unit is provided not only forwards of the front cowl panel in a longitudinal direction of the vehicle body, but also on at least one of the opposite sides of the front cowl panel. At least one of the opposite sides of the front cowl panel is disposed rearwards of the central portion of the front cowl panel in the longitudinal direction of the vehicle body, and the lower end of the front cowl panel is disposed, on at least one of the opposite sides of the front cowl panel, at a location identical with that of or rearwards of an upper end of the lower dash panel in the longitudinal direction of the vehicle body.

10 Claims, 5 Drawing Sheets

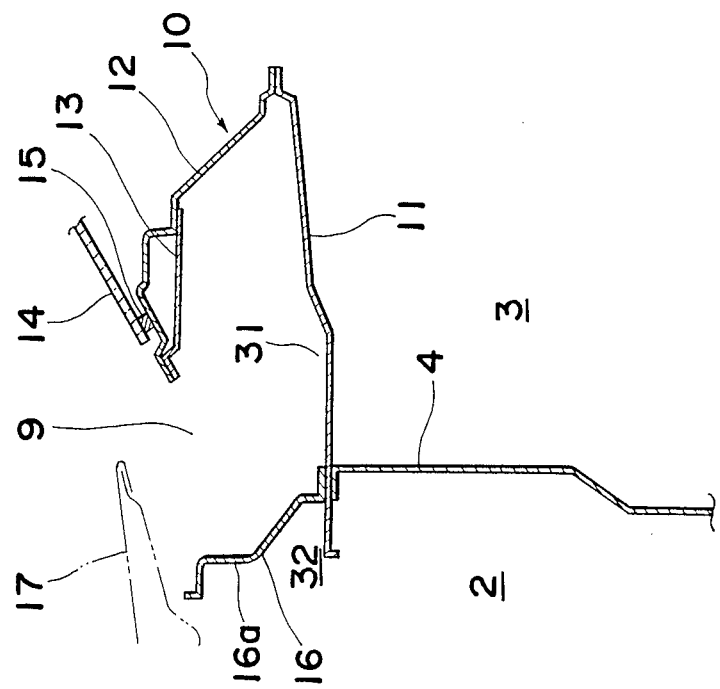
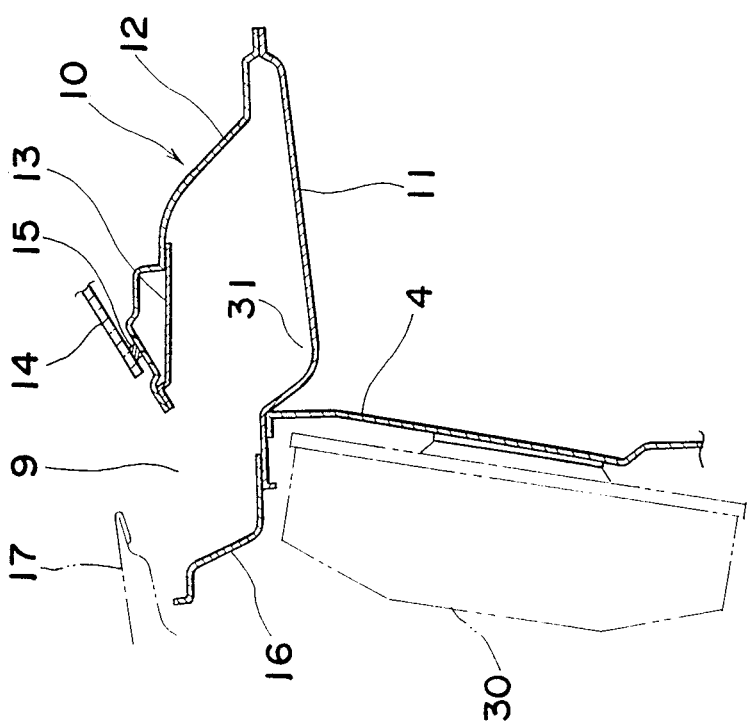

COWL AND DASH PANEL ASSEMBLY FOR A FRONT BODY CONSTRUCTION OF A MOTOR VEHICLE

BACKGROUND OF THE INVENTION

The present invention generally relates to motor vehicles and, more particularly, to an assembly for a front body construction of a motor vehicle.

In a front body construction of a motor vehicle, generally it has been arranged that an engine compartment and a cabin are separated from each other by a lower dash panel, and a cowl portion is provided on the lower dash panel such that a windshield is supported at an upper portion of the cowl portion. An auxiliary unit such as a wiper motor is provided at one of opposite lateral sides of the vehicle body as disclosed in, for example, Japanese Utility Model Laid-Open Publication No. 31956/1986.

Meanwhile, recently, in response to improvement of aerodynamic performance and design requirements of motor vehicles, there is a tendency that the windshield be further inclined rearwards. To accomplish this, since the space within the cabin should be maintained, the cowl portion supporting a lower end portion of the windshield is required to deviate forwards in a longitudinal direction of the vehicle body, namely towards the engine compartment.

However, a pair of suspension pillars or towers are generally provided at the opposite lateral sides of the vehicle body. Hence, if the cowl portion is constructed to deviate towards the engine compartment as described above, the cowl portion is disposed close to the suspension towers. As a result, the auxiliary unit such as the wiper motor cannot be provided between the cowl portion and the suspension towers, thereby resulting in the possibility that the auxiliary unit cannot be mounted on the cowl portion.

SUMMARY OF THE INVENTION

Accordingly, an essential object of the present invention is to provide an assembly for a front body construction of a motor vehicle wherein, in the case where a cowl portion is provided adjacent to a pair of suspension towers in an engine compartment, space for accommodating an auxiliary unit such as a wiper motor is defined between the cowl portion and the suspension towers without adversely affecting the space within the cabin of the motor vehicle.

In order to accomplish this object of the present invention, a front body construction of a motor vehicle according to the present invention includes a lower dash panel for separating an engine compartment and a cabin from each other and a cowl portion provided on the lower dash panel such that a lower end of a windshield may be supported at an upper portion of said cowl portion. The cowl portion includes an upper dash panel which is attached to an upper end portion of the lower dash panel so as to form a bottom wall of the cowl portion and a front cowl panel whose lower end is attached to an upper face of the upper dash panel so as to form a front wall of the cowl portion. The front cowl panel has, in a lateral direction of a vehicle body of the motor vehicle, opposite sides and a central portion between the opposite sides such that space of an auxiliary unit is provided not only forwards of the front cowl panel in a longitudinal direction of the vehicle body, but also on at least one of the opposite sides of the front cowl panel. At least one of the opposite sides of the front cowl panel is disposed rearwards of the central portion of the front cowl panel in the longitudinal direction of the vehicle body, and the lower end of the front cowl panel is disposed, on at least one of the opposite sides of the front cowl panel, at a location identical with that of or rearwards of an upper end of the lower dash panel, with respect to the longitudinal direction of said vehicle body.

By the above described arrangement of the present invention, at least one of the opposite lateral sides of the front cowl panel is disposed rearwards of the laterally central portion of the front cowl portion, with respect to the longitudinal direction of the vehicle body, and the lower end of the front cowl panel is disposed, on at least one of the opposite lateral sides of the front cowl panel, rearwards of the upper end of the lower dash panel, with respect to the longitudinal direction of the vehicle body. Therefore, even if the cowl portion is disposed adjacent to suspension towers, a large space is defined between the front cowl panel and the suspension towers, thereby defining space for positioning of the auxiliary unit.

Furthermore, since the space for the auxiliary unit is formed by rearward displacement of the front cowl panel, with respect to the longitudinal direction of the vehicle body, a rear face of the cowl portion is not required to be displaced rearwards in the longitudinal direction of the vehicle body by displacing the cowl portion itself rearwards in the longitudinal direction of the vehicle body. Therefore, it is not necessary to incur the inconvenience that the space within the cabin of the motor vehicle is reduced.

BRIEF DESCRIPTION OF THE DRAWINGS

This object and features of the present invention will become apparent from the following description of a preferred embodiment thereof with reference to the accompanying drawings, in which:

FIGS. 3, 4, 5, and 6 are sectional views taken along lines 3—3, 4—4, 5—5, and 6—6, respectively, in FIG. 1;

Before the description of the present invention proceeds, it is to be noted that like parts are designated by like reference numerals throughout the several views of the accompanying drawings.

DETAILED DESCRIPTION OF THE INVENTION

Figure 1:
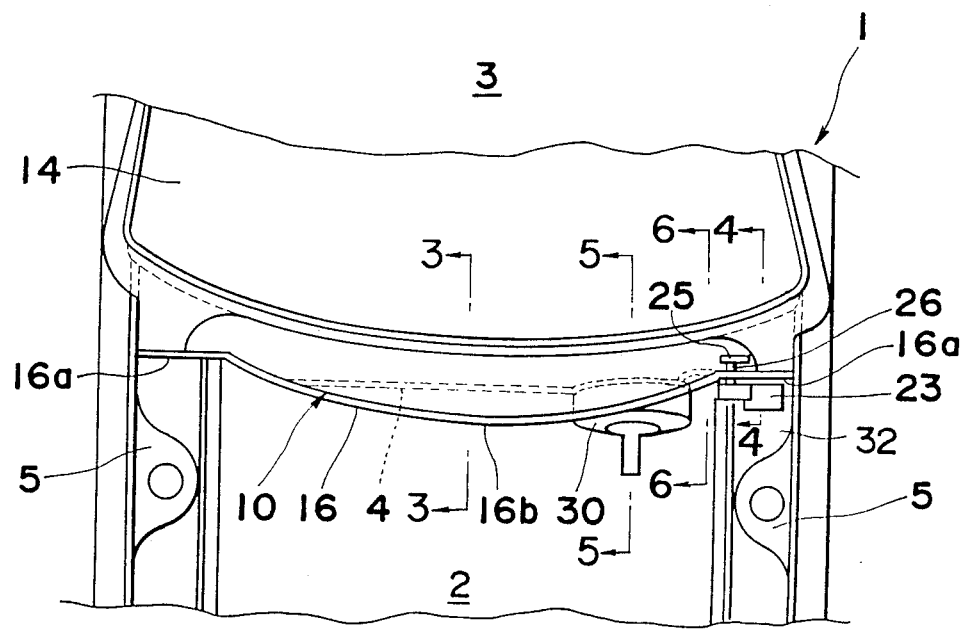
FIG. 1 is a top plan view of a front body construction of a motor vehicle, according to the present invention.

Referring now to the drawings, there is shown in FIGS. 1 to 8 an assembly for a front body construction of a motor vehicle according to one embodiment of the present invention. In FIGS. 1 to 8, reference numeral 1 denotes a vehicle body 1 of the motor vehicle. An engine compartment 2 is formed at a front portion of the vehicle body 1, while a cabin 3 is formed rearwards of the engine compartment 2. The engine compartment 2 and the cabin 3 are separated from each other in a longitudinal direction of the vehicle body 1 by a lower dash panel 4. As shown in FIG. 1, a pair of suspension pillars or towers 5 are provided at opposite sides of the engine compartment 2 at positions spaced in a lateral direction of the vehicle body 1. An engine body, a surge tank, etc. are provided between the suspension towers 5 in a known manner.

A cowl portion 10 is provided on the lower dash panel 4 as shown in FIGS. 2 to 6. This cowl portion 10 has an open structure. In this embodiment, the cowl portion 10 is constituted by an upper dash panel 11, a rear cowl panel 12, a support member 13, and a front cowl panel 16. A front end of the rear cowl panel 12 and a front end of the front cowl panel 16 are spaced from each other so as to form an opening 9 oriented upwardly.

Figure 3:
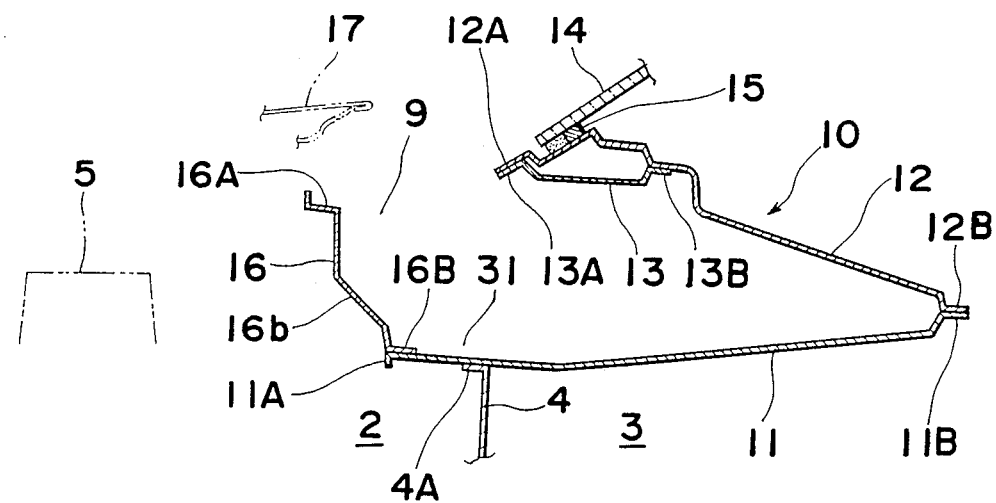

As shown in FIG. 3, the lower dash panel 4 is formed, at an upper end portion thereof, with a flange 4A. The upper dash panel 11 has flanges 11A and 11B formed at its front and rear end portions, and spaced in the longitudinal direction of the vehicle body 1. The rear cowl panel 12 has flanges 12A and 12B formed at its front and rear ends and spaced in the longitudinal direction of the vehicle body 1. The support member 13 has flanges 13A and 13B formed at its front and rear ends and spaced in the longitudinal direction of the vehicle body 1. Meanwhile, the front cowl panel 16 extends obliquely upwardly and has flanges 16A and 16B formed at its upper and lower ends.

The upper dash panel 11 is attached to the flange 4A provided at the upper end portion of the lower dash panel 4. The upper dash panel 11 extends in the longitudinal direction of the vehicle body 1 so as to form a bottom wall of the cowl portion 10. The flange 12B provided at the rear end of the rear cowl panel 12 is attached to the flange 11B provided at the rear end of the upper dash panel 11 such that the rear cowl panel 12 extends in the longitudinal direction of the vehicle body 1. The flange 12A and a substantially central portion of the rear cowl panel 12 in the longitudinal direction of the vehicle body 1 are bridged by the support member 13 and are attached to the flanges 13A and 13B of the support member 13, respectively. As shown in FIGS. 3 to 6, the support member 13 forms a closed cross section in association with the rear cowl panel 12. Rear cowl panel 12 and the support member 13 form an upper wall of the cowl portion 10. A vehicle windshield 14 is bonded to a front end portion of the rear cowl panel 12 by a sealing member 15.

The front cowl panel 16 forms a front wall of the cowl portion 10. The flange 16B provided at the lower end of the front cowl panel 16 is attached to an upper face of the flange 11A provided at the front end of the upper dash panel 11. Meanwhile, the flange 16A disposed at the upper end of the front cowl panel 16 extends obliquely upwardly and forwards in the longitudinal direction of the vehicle body 1 so as to act as an end of a sealing member for a vehicle hood 17. A drain 31 is formed in the cowl portion 10. As shown in FIGS. 3 to 6, this drain 31 is formed by the upper dash panel 11 and the front cowl panel 16 and extends in the lateral direction of the vehicle body 1.

Figure 2:
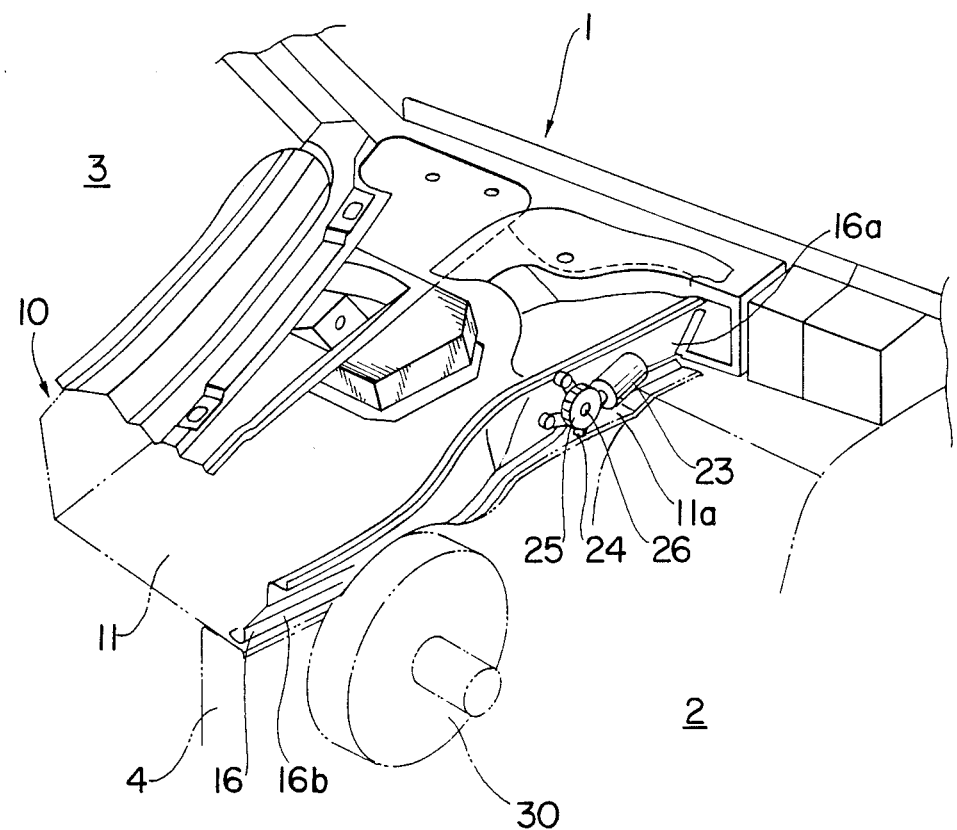
FIG. 2 is an enlarged fragmentary perspective view of the front body construction of FIG. 1.
Figure 4:
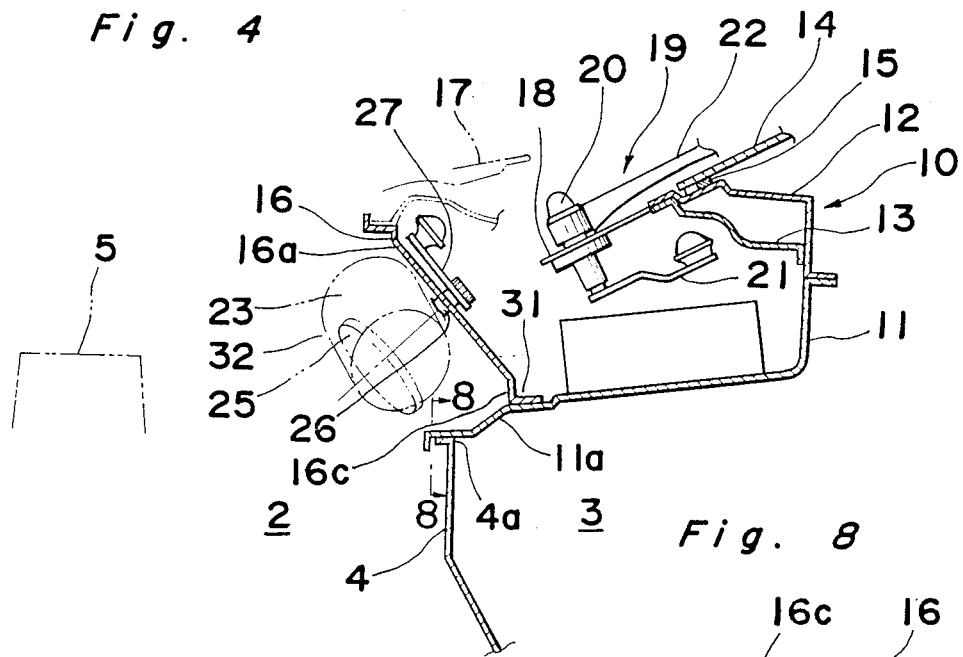

As shown in FIGS. 1, 2 and 4, a wiper motor 23 acting as an auxiliary unit is mounted, at one of opposite sides of the front cowl panel 16 in the lateral direction of the vehicle body 1, on an outer face of the front cowl panel 16 that is directed toward the engine compartment 2. As shown in FIG. 1, the wiper motor 23 is disposed rearwards of a side wall of one of the suspension towers 5 in the longitudinal direction of the vehicle body 1. A driving force of the wiper motor 23 is transmitted, through a worm gear 24 and a worm wheel 25, to an output shaft 26. The output shaft 26 extends through the front cowl panel 16 so as to rotate an arm 27 located within the cowl portion 10 such that rotation of the arm 27 is transmitted to a wiper device 19 through a link mechanism (not shown). As shown in FIG. 4, the wiper device 19 is supported in the cowl portion 10 via a bracket 18 and is constituted by a pivotal shaft 20, an arm 21 for receiving a driving force from the arm 27, a wiper arm 22, and other known structure.

As shown in FIGS. 1, 2 and 5, a toggle joint 30 is mounted, inwardly of the wiper motor 23 with respect to the lateral direction of the vehicle body 1, on the lower dash panel 4. In order to enable the toggle joint 30 to be mounted on the lower dash panel 4, a front end portion of the upper dash panel 11 is formed so as to rise upwardly as shown in FIGS. 2 and 5.

Figure 8:
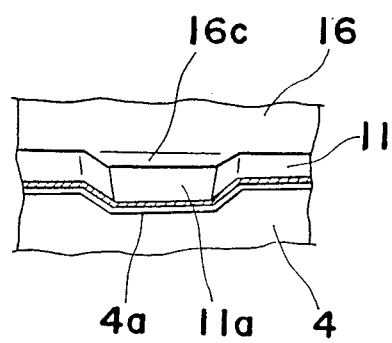
FIG. 8 is a sectional view taken along the line 8—8 in FIG. 4.

As shown in FIGS. 2, 4 and 8, at the rear of mounting of the wiper motor 23, the upper end of the lower dash panel 4 has a downwardly extending recess 4a. The front end portion of the upper dash panel 11 has a concave portion 11a corresponding to the shape of recess 4a and curved downwardly along the recess 4a of the lower dash panel 4 so as to have a lower height. The front cowl panel 16 has a projection 16c fitted into the concave portion 11a of the upper dash panel 11.

In the lateral direction of the vehicle body 1, the front cowl panel 16 has a pair of opposite side portions 16a and a central portion 16b, as shown in FIG. 1. It is to be noted that since the front body construction is symmetrical with respect to a longitudinal axis of the vehicle body 1, only one of the opposite side portions 16a is illustrated for the sake of brevity in FIG. 2. As will be seen from FIG. 1, the opposite side portions 16a are disposed rearwards of the central portion 16b in the longitudinal direction of the vehicle body 1. Furthermore, the upper end portion of the front cowl panel 16 is disposed at a location identical with that of known front body constructions so as to act as the end of the sealing member for the hood 17. As shown in FIGS. 3 to 6, the upper end of the front cowl panel 16 is disposed, throughout its entire dimension in the lateral direction of the vehicle body 1, forwards of the upper end of the lower dash panel 4, with respect to the longitudinal direction of the vehicle body 1.

Meanwhile, at the opposite sides of the front cowl panel 16, in the lateral direction of the vehicle body 1, the lower end portion of the front cowl panel 16 is disposed at a location identical with that of the upper end portion of the lower dash panel 4, as shown in FIG. 6, and rearwards of the upper end portion of the lower dash panel 4 at the concave portion 11a of the upper dash panel 11 as shown in FIG. 4 in the longitudinal direction of the vehicle body 1. Thus, the drain 31 is formed at a substantially identical height over its entire dimension in the lateral direction of the vehicle body 1 so as to function properly.

Figure 7A:
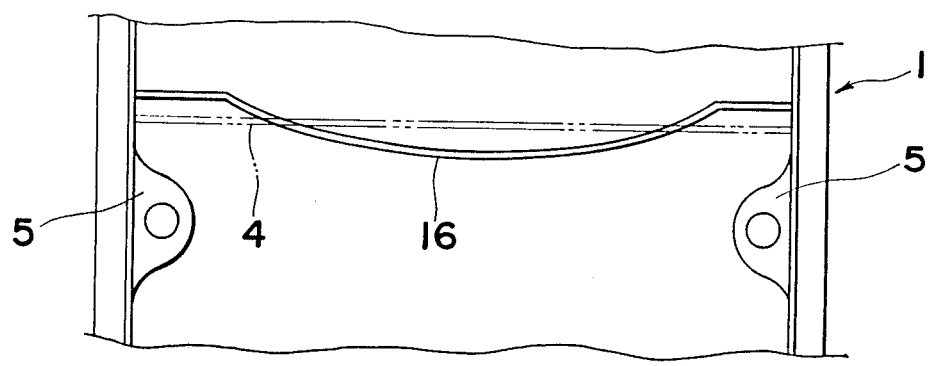
FIGS. 7a, 7b, and 7c are views similar to FIG. 1, particularly showing positional relationships of a front cowl panel and a lower dash panel employed in the front body construction of FIG. 1.
Figure 7B:
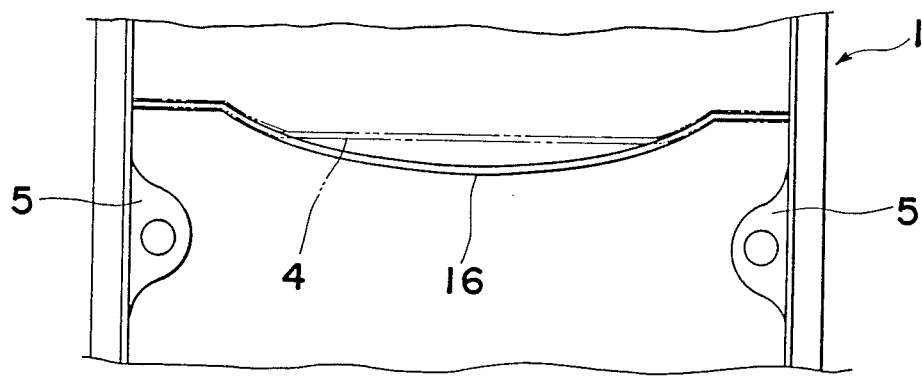
Figure 7C:
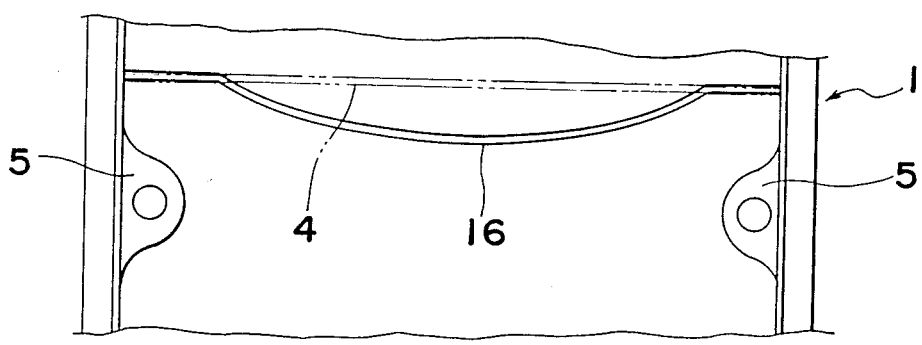

As shown in FIGS. 7a to 7c, the lower end portion of the front cowl panel 16 and the upper end portion of the lower dash panel 4 can be arranged in various relative manners. It will be apparent from FIGS. 7a to 7c that the upper end portion of the lower dash panel 4 extends substantially linearly in the lateral direction of the vehicle body 1.

Therefore, by the above described arrangement of the front body construction, since the opposite side portions 16a of the front cowl panel 16 are disposed rearwards of the central portion 16b, with respect to the longitudinal direction of the vehicle body 1, the distance between the front cowl panel 16 and the suspension towers 5 can be increased at the opposite lateral sides of the vehicle body 1 more than that of known front body constructions, to thereby expand the space therebetween.

Furthermore, at the opposite lateral sides of the front cowl panel 16, the lower end portion of the front cowl panel 16 is disposed at a location identical with that of or rearwards of the upper end portion of the lower dash panel 4, with respect to the longitudinal direction of the vehicle body 1. Therefore, at each of the opposite lateral sides of the vehicle body 1, a space can be formed between the outer face of the front cowl panel 16 and the upper face of the upper dash panel 11 as shown in FIG. 4. As a result, even when the cowl portion 10 is disposed adjacent to the suspension towers 5 in response to further rearward inclination of the windshield glass 14, spaces 32 sufficient for accommodating auxiliary units such as the wiper motor 23 can be defined between the front cowl panel 16 and the suspension towers 5 and between the outer face of the front cowl panel 16 and the upper face of the upper dash panel 11, as referred to above.

In this case, the space of the cabin 3 is not reduced in order to secure the space 32. Namely, in the present invention, it is not necessary to adopt an arrangement in which in order to secure the space 32, the cowl portion 10 itself is displaced rearwards from the lower dash panel 4 at the opposite lateral sides of the vehicle body such that the rear face of the cowl portion 10 is displaced rearwards into the cabin 3.

As is clear from the foregoing description, in accordance with the present invention, in the case where the cowl portion is disposed adjacent to the suspension towers in the engine compartment, spaces for accommodating auxiliary units can be defined between the cowl portion and the suspension towers without adversely affecting the space within the cabin.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An assembly for a front body construction of a motor vehicle, said assembly comprising:
   a lower dash panel for separating an engine compartment and a cabin;
   a cowl portion mounted on said lower dash panel for supporting a lower end of a windshield;
   said cowl portion including an upper dash panel attached to an upper end of said lower dash panel, thereby forming a bottom wall of said cowl portion, and a front cowl panel having a lower end attached to an upper face of said upper dash panel, thereby forming a front wall of said cowl portion;
   said front cowl panel having an upper end positioned forwardly of said lower end thereof throughout an entire dimension thereof in a lateral direction of a vehicle body of the motor vehicle;
   said front cowl panel having, with respect to said lateral direction of the vehicle body of the motor vehicle, opposite sides and a central portion between said opposite sides; and
   at least one of said opposite sides of said front cowl panel being disposed rearwardly of said central portion of said front cowl panel, with respect to a longitudinal direction of the vehicle body, and said lower end of said front cowl panel, at said at least one opposite side thereof, being disposed at a location that is not further forward than that of said upper end of said lower dash panel, with respect to said longitudinal direction of the vehicle body;
   thereby defining a space for an auxiliary unit provided forwardly of said front cowl panel, with respect to said longitudinal direction of the vehicle body, and at said at least one of said opposite sides of said front cowl panel.

2. An assembly as claimed in claim 1, further comprising the auxiliary unit mounted in said space on one face of said front cowl panel directed toward the engine compartment.

3. An assembly as claimed in claim 2, wherein said auxiliary unit is a drive unit for driving a wiper.

4. An assembly as claimed in claim 1, wherein said upper end of said lower dash panel extends substantially rectilinearly in said lateral direction of the vehicle body.

5. An assembly as claimed in claim 4, wherein said upper end of said front cowl panel is disposed, throughout the entire dimension thereof in said lateral direction of the vehicle body, forwardly of said upper end of said lower dash panel, with respect to said longitudinal direction of the vehicle body.

6. An assembly as claimed in claim 1, wherein said cowl portion further includes a rear cowl panel attached to a rear end portion of said upper dash panel, and a support member attached to said rear cowl panel such that said rear cowl panel and said support member define a closed cross section, said upper portion for supporting the windshield comprising a front end of said rear cowl panel.

7. An assembly as claimed in claim 6, wherein said front end of said rear cowl panel and a front end of said front cowl panel are spaced from each other.

8. An assembly as claimed in claim 1, further comprising the auxiliary unit mounted in said space at a position that is rearward of that of one of a pair of suspension pillars of the vehicle body, with respect to said longitudinal direction thereof.

9. An assembly as claimed in claim 1, wherein said upper end of said lower dash panel is formed, adjacent said space, with a downwardly extending recess.

10. An assembly as claimed in claim 9, wherein said front cowl panel is formed with a projection having a shape corresponding to that of said recess.

* * * * *